US012627011B2

(12) United States Patent
Cregut et al.

(10) Patent No.: US 12,627,011 B2
(45) Date of Patent: May 12, 2026

(54) SYSTEM FOR PROTECTING A DEVICE HAVING VARIABLE INTERNAL RESISTANCE

(71) Applicant: RENAULT s.a.s., Boulogne-Billancourt (FR)

(72) Inventors: Samuel Cregut, Saint Remy les Chevreuse (FR); Masato Origuchi, Rambouillet (FR); Irina Marincas, Montrouge (FR); Antoine Saint-Marcoux, Palaiseau (FR)

(73) Assignee: Ampere S.A.S., Boulogne-Billancourt (FR)

( * ) Notice: Subject to any disclaimer, the term of this patent is extended or adjusted under 35 U.S.C. 154(b) by 50 days.

(21) Appl. No.: 17/642,880

(22) PCT Filed: Sep. 8, 2020

(86) PCT No.: PCT/EP2020/075103
§ 371 (c)(1),
(2) Date: Mar. 14, 2022

(87) PCT Pub. No.: WO2021/058278
PCT Pub. Date: Apr. 1, 2021

(65) Prior Publication Data
US 2022/0399618 A1      Dec. 15, 2022

(30) Foreign Application Priority Data
Sep. 25, 2019      (FR) ....................................... 1910555

(51) Int. Cl.
| | |
|---|---|
| H01M 50/578 | (2021.01) |
| H01M 50/581 | (2021.01) |
| H01M 50/583 | (2021.01) |

(52) U.S. Cl.
CPC ....... H01M 50/578 (2021.01); H01M 50/581 (2021.01); H01M 50/583 (2021.01); *H01M 2200/103* (2013.01); *H01M 2220/20* (2013.01)

(58) Field of Classification Search
CPC ........... H01M 50/569–597; H01M 10/42–488; H01M 50/578; H01M 50/581; H01M 50/583; H01M 2200/103; H01M 2200/20
See application file for complete search history.

(56) References Cited

U.S. PATENT DOCUMENTS

2014/0170450 A1 *   6/2014   Takahashi ........... H01M 50/586
                                                                 429/62
2017/0299660 A1    10/2017   Saint-Marcoux et al.
(Continued)

FOREIGN PATENT DOCUMENTS

EP          3 252 914 A1    12/2017
KR       20190091037 A  *   8/2019
WO    WO 2013/176087 A1    11/2013

OTHER PUBLICATIONS

Oxford English Dictionary, s.v. "fuse (n.5)," Jul. 2023, https://doi.org/10.1093/OED/7933485986. (Year: 1884).*
(Continued)

*Primary Examiner* — Haroon S. Sheikh
(74) *Attorney, Agent, or Firm* — Oblon, McClelland, Maier & Neustadt, L.L.P.

(57) ABSTRACT

A system for protecting a device having variable internal resistance includes a protection fuse capable of blowing when a current having an intensity greater than an intensity threshold passes through. The system also includes an estimator suitable for estimating the internal resistance of the device, and a safety device suitable for limiting and/or
(Continued)

preventing use of the device when the internal resistance is greater than a resistance threshold beyond which the protection fuse is inoperative.

8 Claims, 5 Drawing Sheets

(56)                References Cited

U.S. PATENT DOCUMENTS

2017/0328936 A1    11/2017  Park et al.
2019/0165586 A1 *   5/2019  Adachi ................ G01R 31/389

OTHER PUBLICATIONS

Machine translation of KR 20190091037 A (published Aug. 5, 2019) (Year: 2019).*
Nomura—WO2013176087A1—Updated English Translation including paragraph numbers (Year: 2013).*
International Search Report issued Oct. 20, 2020 in PCT/EP2020/075103, filed on Sep. 8, 2020, 2 pages.
French Preliminary Search Report issued May 20, 2020 in French Application 19 10555, filed on Sep. 25, 2019, 7 pages (with English Translation of Categories of Cited documents & Written Opinion).

* cited by examiner

SYSTEM FOR PROTECTING A DEVICE HAVING VARIABLE INTERNAL RESISTANCE

TECHNICAL FIELD OF THE INVENTION

The present invention relates in general to the safety of storage batteries.

It relates more particularly to a protection system for protecting a device having variable internal resistance, such as an electrochemical cell of a storage battery, this protection system comprising a fuse that is able to melt when it is flowed through by a current of a strength greater than a predefined strength threshold.

It also relates to a method for protecting such a device.

The invention is applied to particular advantage in the production of storage batteries for electric or hybrid vehicles.

PRIOR ART

Electric and hybrid vehicles are specifically equipped with storage batteries that supply current to electric motors for propelling these vehicles.

As taught by document US2017005384, such a storage battery generally comprises a plurality of modules that each incorporate a large number of distinct electrochemical cells.

These cells use chemical compounds to store electrical energy, which are potentially hazardous if the cell is over-charged.

One common system for safeguarding a storage battery then consists in individually monitoring the voltage across the terminals of each cell and in disconnecting the current in the event of overcharging. Implementing this technical solution unfortunately requires the use of numerous expensive components that are connected redundantly in order to achieve the desired degree of safety.

Another solution, described in document US2017005384, consists in equipping each cell with its own integrated safety device. This safety device then comprises firstly a fuse connected between the chemical compounds and the positive terminal of the cell, and secondly a pressure switch connected between the two terminals of this same cell.

Thus, in the event of overpressure in the cell, the switch closes, thereby creating a short circuit in the cell and causing the fuse to melt, thus putting the storage battery into a safe state.

A first drawback of this solution is that this melting generates an immobilizing breakdown for the vehicle.

A second drawback, which the applicant has observed and which proves to be more serious than the first one, is that the fuse does not melt when the cell is short-circuited, generating a risk of the storage battery catching fire or exploding.

PRESENTATION OF THE INVENTION

In order to remedy the abovementioned drawbacks of the prior art, the present invention proposes to improve the safety of the storage battery by adding a computerized means for detecting the ageing of the battery.

More particularly, what is proposed according to the invention is a protection system as defined in the introduction, in which provision is made for estimation means designed to estimate the internal resistance of the device (for example the internal resistance of the electrochemical cell), and safeguarding means designed to limit and/or to prevent the use of this device as soon as said internal resistance is greater than a resistance threshold chosen such that the device still has the capacity to melt the fuse.

Specifically, the applicant has observed that, when the state of ageing of an electrochemical cell is advanced, and therefore its internal resistance is excessively high, the electric power able to be developed by this cell is not always sufficient to melt the fuse.

Instead of using a smaller fuse (which could be problematic in the event of a high burden on the cell, since the fuse could melt in an unwanted manner), the invention instead proposes to monitor the state of ageing of the cell such that the user is able to be invited, preferably preventively, to have his storage battery serviced before the cell is no longer able to develop the electric power needed to melt the fuse.

Other advantageous and non-limiting features of the protection system according to the invention, taken individually or in any technically possible combination, are as follows:

said resistance threshold is equal to the internal resistance beyond which the device no longer has the capacity to melt the fuse, to within a safety margin;

with said device comprising two electrical connection terminals, provision is made for a switch designed to automatically close the electrical circuit between the two terminals in the event of overpressure in said device;

the estimation means are designed to estimate said internal resistance only if one or more or all of the following conditions are met:

if the device is in the discharging phase, if the strength of the current delivered by the device is within a range of predefined values, if the variation over time of the strength of the current delivered by the device is greater than a predefined variation threshold, if the internal temperature of said device is within a predefined temperature range;

the estimation means are designed to attempt to estimate said internal resistance periodically;

the safeguarding means are designed to warn a user of an upcoming limitation and/or an upcoming prevention of the use of the device by the safeguarding means if the internal resistance is greater than a second resistance threshold;

the safeguarding means are designed to limit the use of the device if the internal resistance is greater than a third threshold;

the third threshold is strictly greater than the second threshold;

the safeguarding means are designed to prevent the use of the device if the internal resistance is greater than said resistance threshold, which resistance threshold is strictly greater than the third threshold.

The invention also relates to a storage battery comprising an electrochemical cell equipped with a protection system as mentioned above.

The invention also proposes a method for protecting a device having variable internal resistance, such as an electrochemical cell, equipped with a protective fuse, comprising:

a step of estimating the internal resistance of said device, a step of comparing the internal resistance with at least one resistance threshold beyond which the protective fuse is inoperative, and, if the internal resistance is greater than said resistance threshold, a safeguarding step in which the use of the device is prevented or limited, such that the device still has the capacity to melt the fuse.

Of course, the various features, variants and embodiments of the invention may be combined with one another in various combinations, provided that they are not incompatible with one another or mutually exclusive.

DETAILED DESCRIPTION OF THE INVENTION

The description that follows with reference to the appended drawings, which are given by way of non-limiting example, will make it easy to understand of what the invention consists and how it may be implemented.

Figure 1:
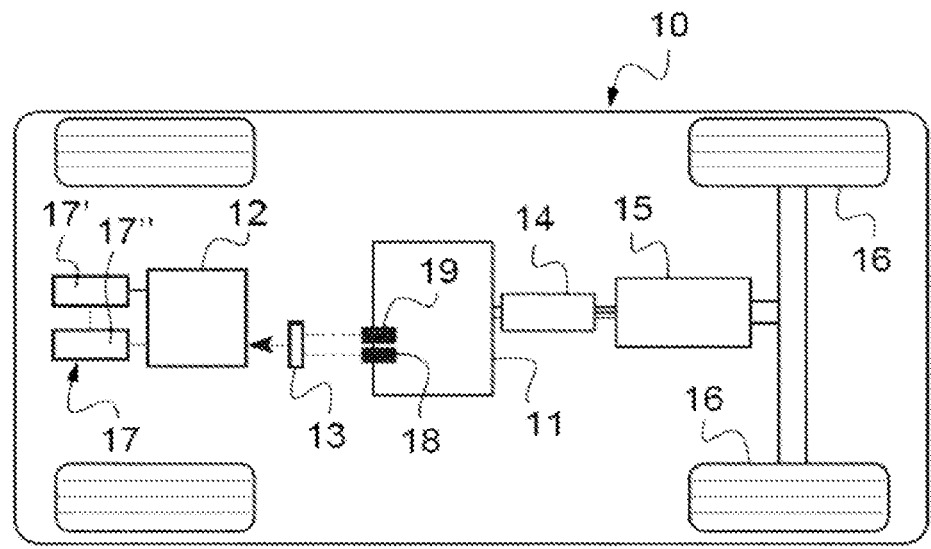
FIG. 1 is a schematic view of a motor vehicle equipped with a storage battery according to the invention.

FIG. 1 very schematically shows a motor vehicle 10 that comprises two drive wheels 16.

It is an electric vehicle in this case. As a variant, it could also be a hybrid vehicle.

The motor vehicle 10 shown in FIG. 1 therefore comprises at least one electric motor 15 for driving the two drive wheels 16 in rotation. It also comprises a storage battery 11 that makes it possible to supply current to this electric motor 15, via an inverter 14.

This storage battery 11 comprises a storage housing that houses a large number of electrochemical cells 20.

The motor vehicle 1 also comprises a measuring means 18 for measuring the temperature of this storage battery 11, for example in the form of a temperature probe installed inside the storage housing of the storage battery 11.

It also comprises acquisition means 19 for acquiring the voltage $U_{batt}$ across the terminals of each electrochemical cell 20 and the current $I_{batt}$ delivered or received by each of these electrochemical cells 20.

To manage its various units, the motor vehicle 1 comprises a computer 12 that comprises a processor and a memory, and that is equipped with various input and output interfaces 13.

Through its input interfaces, the computer 10 is designed to receive input signals from the measurement and acquisition means 18 and 19, respectively. It is thus designed to acquire the internal temperature T of the storage battery 11, along with the voltage $U_{batt}$ across the terminals of each electrochemical cell 20 and the current $I_{batt}$ delivered or received by each of these cells.

Through its memory, the computer 12 stores a computerized application, consisting of computer programs comprising instructions that, when executed by the processor, allow the computer 12 to implement the method described below.

Finally, through its output interfaces, the computer 12 is designed to communicate with a safety system 17 for safeguarding the storage battery 11. Here, this safety system 17 comprises in particular a display screen 17' arranged on the dashboard of the vehicle, along with a control element 17" for controlling the charging of the storage battery.

Figure 2:
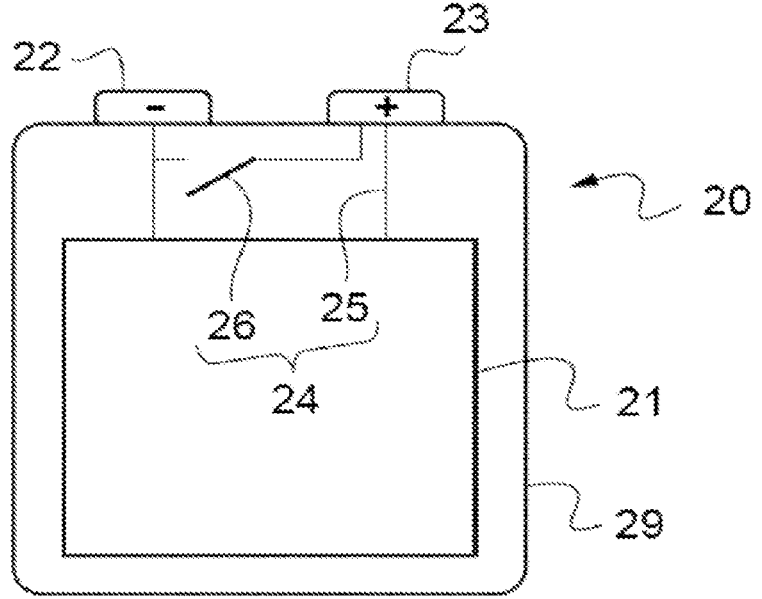
FIG. 2 is a schematic view of an electrochemical cell of the storage battery of FIG. 1.

FIG. 2 shows one of the electrochemical cells 20 of the storage battery of FIG. 1.

It will be considered here that these cells all have the same reference and are connected in series with one another. In this disclosure, there will then more particularly be a focus on just one of them.

As shown in FIG. 2, the electrochemical cell 20 comprises a casing 29 that houses electrochemical components 21 (here two electrodes immersed in a lithium ion-based electrolyte), and two terminals 22 (negative), 23 (positive), respectively connected to these two electrodes.

Here, the electrochemical cell 20 is equipped with a partially integrated and partially remote protection system.

The remote part of this protection system comprises the abovementioned safety system 17.

The integrated part of this protection system comprises a fuse 25 and a switch 26 that are housed in the casing 29.

The switch 26 is connected between the two terminals 22, 23 of the cell. It is supplied in the open state, and it is designed to close automatically in the event of overpressure in the casing 29. It comprises a pressure-sensitive membrane for this purpose.

It thus makes it possible, in particular in the event of electrical overcharging likely to cause a fire, to short-circuit the electrochemical cell 20.

The fuse 25 for its part connects the positive terminal 23 of the electrochemical cell 20 to the corresponding electrode. It is intended to melt (and open the circuit) when it is flowed through by a current of a strength $I_{batt}$ greater than a determined strength threshold.

It is therefore intended in particular to melt when the switch 26 short-circuits the electrochemical cell 20.

The combination of this fuse 25 and this switch 26 thus makes it possible to protect the storage battery 11 from risks of explosion and fire.

As is known, an electrochemical cell 20 ages in line with the charging and discharging cycles to which it is subjected.

When it ages, its internal resistance Ri increases. It may then be the case that its electrochemical components 21 are no longer capable of developing sufficient electric power to melt the fuse 25.

This is why, according to one particularly advantageous feature of the invention:

the protection system for protecting the storage battery 11 comprises estimation means (formed here by the computer 12) designed to estimate the internal resistance Ri of each electrochemical cell 20, and the safety system 17 is designed to limit and/or to prevent the use of the storage battery 11 when this internal resistance Ri is greater than a first resistance threshold $S_{R1}$, this threshold being chosen such that each electrochemical cell 20 has the capacity to melt its fuse 25 for as long as its internal resistance Ri is lower than this first resistance threshold $S_{R1}$.

The way in which the internal resistance Ri of each electrochemical cell 20 is calculated will be described below.

Figure 3:
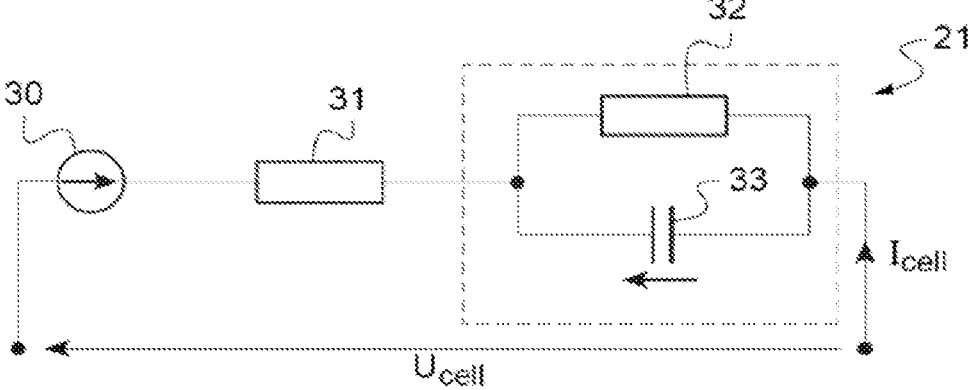
FIG. 3 is a circuit diagram of the electrochemical cell of FIG. 2.

To understand these calculations, it is possible to first model the electrochemical cell 20 in the form of the electrical circuit 21 of FIG. 3.

In this figure, the electrical circuit 21 comprises an ideal voltage source 30, a resistor 31 and a parallel RC circuit, which are connected in series with one another.

The ideal voltage source 30 has a voltage value that depends on the level of charge BSOC of the electrochemical cell 20. It will be recalled here that the level of charge BSOC represents, as a percentage, the amount of electrical energy remaining in the cell. Its value is therefore 100% when the cell is fully charged, and 0% when it is fully discharged.

The resistor 31 represents the internal resistance Ri of the electrochemical cell 20. This depends in particular on the state of ageing of this cell.

The parallel RC circuit comprises a resistor 32 and a capacitor 33 that are connected in parallel. This illustrates the fact that the cell has a non-zero response time in the event of charging and discharging. The resistance and capacitance values are chosen here based on the measurable response time of the cell.

Figure 4:
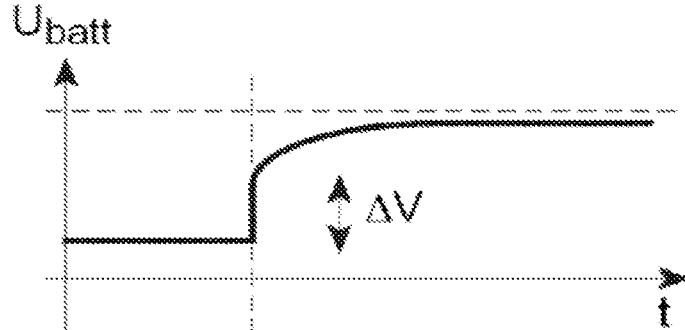
FIG. 4 is a graph illustrating the variation of the voltage across the terminals of the electrochemical cell of FIG. 2 when the latter receives a step current.
Figure 5:
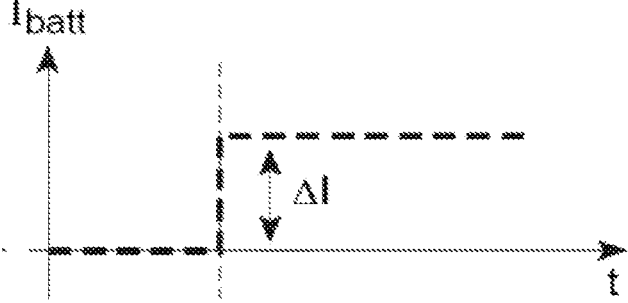
FIG. 5 is a graph illustrating this step current.

FIGS. 4 and 5 then show the voltage $U_{batt}$ across the terminals of the electrochemical cell 20 and the current $I_{batt}$ that flows through it when it receives a charging current in the form of a step current of value ΔI. An instantaneous variation of the voltage is observed therein during this charging, of value ΔV, which variation then continues progressively until reaching a threshold.

Given the modeling under consideration of the electrochemical cell 20, the internal resistance Ri of the cell may be obtained using the equation:

$$Ri = \Delta V / \Delta I \qquad \text{[Math. 1]}$$

The computer 12 is then programmed to calculate this internal resistance Ri periodically, with a sampling frequency that is neither too high nor too low (typically of the order of a second).

Preferably, it is programmed to calculate an estimate of this internal resistance Ri only when certain conditions of use of the electrochemical cell 20 are met.

Specifically, it has been observed that the reliability of the estimate of this internal resistance Ri might depend on the conditions of use of this cell.

Figure 6:
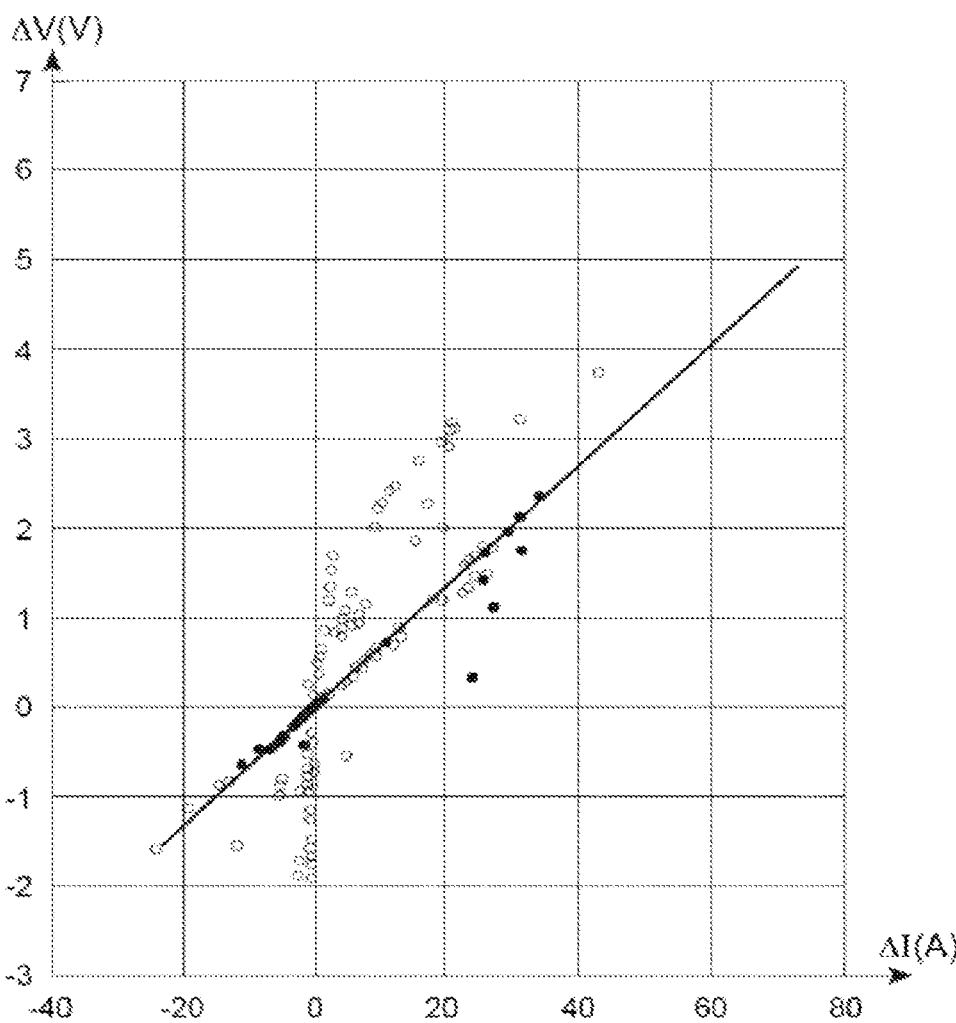
FIG. 6 is a graph showing, in the form of points, the result of tests performed on the electrochemical cell of FIG. 2, the ordinate showing a measured voltage difference and the abscissa showing a difference in current delivered by the cell.

Then, to determine the conditions necessary to achieve a good estimate of this internal resistance Ri, a series of tests were carried out, the results of which are illustrated in FIG. 6 in the form of points.

In these tests, the values ΔI and ΔV were measured under various conditions of use of the electrochemical cell 20. If none of these conditions had influenced the results, all of the points should have been aligned along an affine straight line with a slope equal to the internal resistance Ri of the cell.

However, this was not the case.

Figure 7:
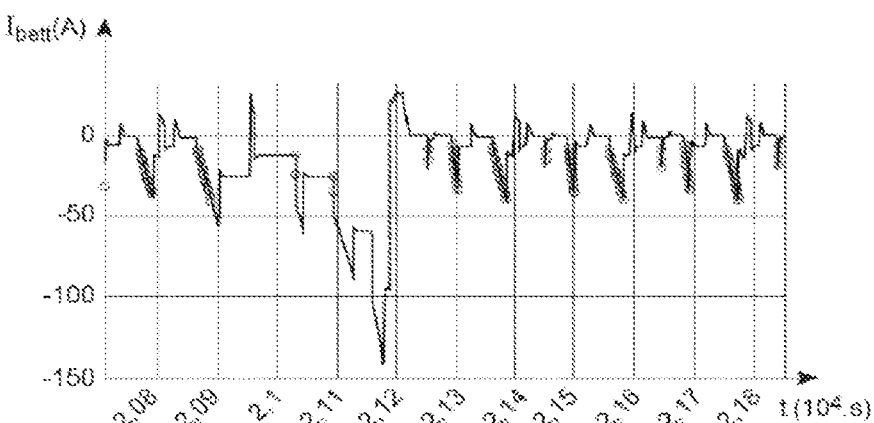
FIG. 7 is a graph showing the variation over time of the current delivered by the electrochemical cell of FIG. 2 in these tests.
Figure 8:
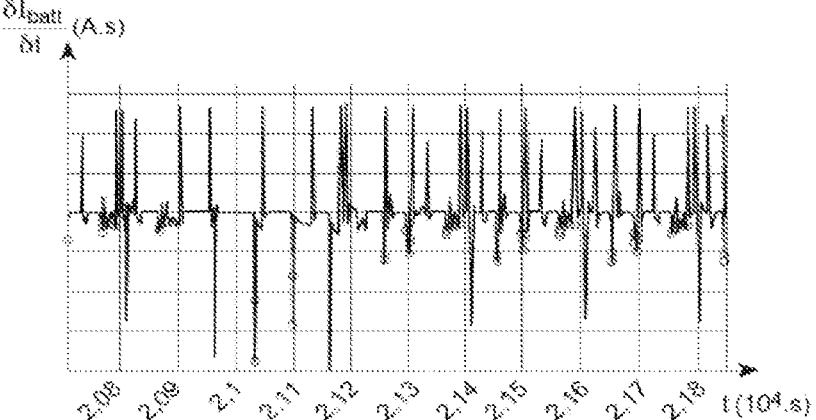
FIG. 8 is a graph showing, as a function of time, the rate of variation of the current delivered by the electrochemical cell of FIG. 2 in these tests.

FIGS. 7 and 8 then illustrate the variations over time of the current $I_{batt}$ delivered by the electrochemical cell 20 and the rate of variation of this current.

The times corresponding to the points of FIG. 6 located along the affine straight line have been marked by points. It was thus able to be observed that the current and the rate of variation of this current had to meet specific conditions of use in order for the results of the estimate of the internal resistance Ri to be reliable.

It was thus able to be observed that the estimate of the internal resistance Ri is reliable if the cell is in the discharging phase, if it delivers a current between 5 and 40 A and if the variation of this current between two successive sampling times is great enough (here, if the rate of variation of the current $\delta I_{batt}/\delta t$ is greater than 1 A/s).

Figure 9:
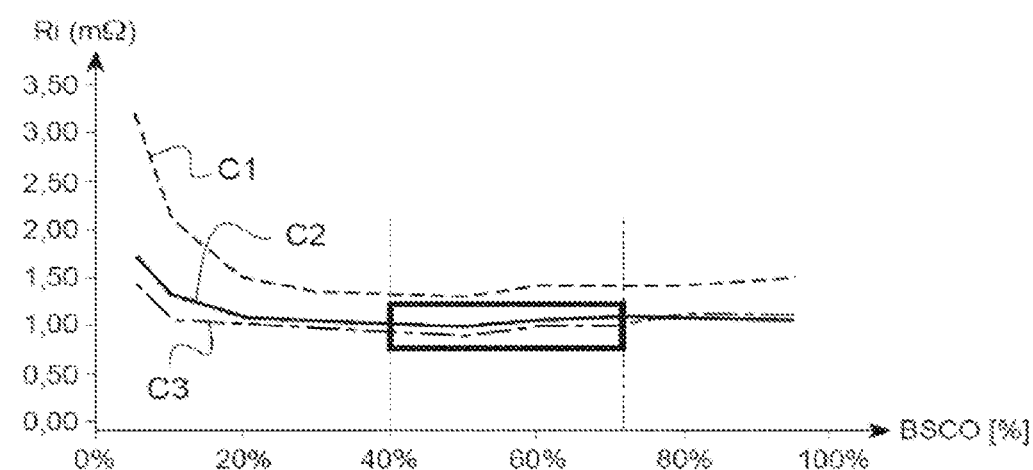
FIG. 9 is a graph showing the variation of the measured internal resistance of the electrochemical cell of FIG. 2 as a function of its level of charge.

FIG. 9 also plots the results of the tests so as to observe the influence of the level of charge BSOC and the internal temperature of the cell on the estimate of the internal resistance Ri.

It was thus able to be observed that, if the internal temperature T of the cell is not high enough (25 degrees on the curve C1), a slight temperature variation may affect the results of the estimate of the internal resistance Ri. It will thus be preferred to operate between 45° C. (curve C2) and 55° C. (curve C3).

It was also able to be observed that the level of charge BSOC of the electrochemical cell 20 had little influence on the results of the estimate of the internal resistance Ri, provided that this level of charge is between 40 and 75%.

Various conditions of use of the electrochemical cell 20 were thus able to be found and selected as being necessary to obtain a reliable estimate of the internal resistance Ri.

With these data now having been explained in detail, a description may be given of the way in which the computer 12 of the motor vehicle 10 proceeds in order to safeguard the use of each electrochemical cell 20 in the storage battery 11.

For this purpose, the computer 12 proceeds in a loop, iteratively repeating the steps described below. These steps are implemented in the same way for each electrochemical cell 20. To simplify the present disclosure, only one of these cells will then be focused on below.

In a first step, the computer acquires the internal temperature T of the storage battery 11.

It also acquires values of voltage $U_{batt}$ and current $I_{batt}$ for the electrochemical cell 20.

In a second step, the computer 12 determines whether the conditions of use of the electrochemical cell 20 are met in order to estimate the internal resistance Ri of this cell.

For this purpose, the computer determines whether the electrochemical cell 20 is in a discharging phase, whether the strength $I_{batt}$ of the current delivered by the cell is within a range of predefined values (here between 5 and 40 A), whether the rate of variation of the strength $I_{batt}$ of the current delivered by the device 20 is greater than a predefined variation threshold (here 1 A/s), and whether the internal temperature of the storage battery 11 is within a predefined temperature range (here from 45 to 55° C.).

Of course, as a variant, the abovementioned ranges could be different. A number of different conditions of use of the cells could also be considered.

Here, if these conditions are met, the computer measures the values ΔU and ΔI and then deduces therefrom an estimate of the internal resistance Ri on the basis of the abovementioned equation "Math. 1". If not, the method resets.

At this stage, the computer 12 may directly consider this estimate to be a good approximation of the internal resistance Ri of the electrochemical cell 20.

However, here, this estimate will be combined with multiple other estimates made previously, so as to obtain a better estimate of the internal resistance Ri. It is thus possible for example to take an average over a sliding window encompassing several hundred previous results (for example 500 or 1000), and to consider that the internal resistance Ri is equal to this average, which will avoid any false measurement.

Once the evaluation of the internal resistance Ri has been obtained, the computer 12 compares this internal resistance with at least one resistance threshold.

In practice, here, this internal resistance Ri is compared with three resistance thresholds $S_{R1}$, $S_{R2}$, $S_{R3}$.

These three resistance thresholds $S_{R1}$, $S_{R2}$, $S_{R3}$ are equal, to within three safety margins, to the value of the internal resistance Ri beyond which it is considered that it is no longer possible to guarantee to the user that the electrochemical cell 20 will still have the electric power needed to melt the fuse 25.

The safety margins under consideration are different.

The first resistance threshold $S_{R1}$ has the smallest safety margin, while the second threshold $S_{R2}$ has the largest safety margin, meaning that it is possible to write:

$$S_{R1} > S_{R3} > S_{R2} \qquad \text{[Math. 2]}$$

Four cases are then conceivable, depending on whether the internal resistance is contained within one or the other of the four intervals defined by these thresholds.

Thus, if the internal resistance Ri is less than or equal to these three thresholds, the method is reset. This corresponds to the case where the internal resistance Ri indicates that the electrochemical cell 20 is in a good condition and that, in the event of closing of the switch 26, this cell will have the electric power needed to melt the fuse 25.

If the internal resistance Ri is between the second and the third threshold $S_{R2}$, $S_{R3}$, which means that the electrochemical cell 20 is in an advanced state of ageing but that it is still able to melt the fuse 25, the computer 12 is programmed to command the display of a message to the driver on the display screen 17'. This message is then intended to warn the driver that his storage battery 11 will be unusable within a limited number of charging cycles. The message may for example display the fact that the storage battery 11 will no longer be usable after five charging cycles, and that it should therefore be changed or serviced accordingly.

If the internal resistance Ri is between the third and the first thresholds $S_{R1}$, $S_{R3}$, which means that the electrochemical cell 20 is in a highly advanced state of ageing and that it is still just about able to melt the fuse 25, the computer 12 is programmed to command the display of a message to the driver on the display screen 17', warning him that his battery will be unusable within a very small number of charging cycles. The computer 12 is furthermore programmed to send, to the control element 17", a signal telling it that it should only allow a small number of battery recharging cycles (for example one or two), and then prevent any recharging of the battery.

Finally, if the internal resistance Ri is greater than the first threshold $S_{R1}$, which means that the electrochemical cell 20 is in a state of ageing that is too advanced to be certain that it is still able to melt the fuse 25, the computer 12 is programmed to command the display of a message to the driver on the display screen 17', warning him that his battery is no longer able to be recharged. The computer 12 is furthermore programmed to send, to the control element 17", a signal telling it that it should prevent any new recharging of the battery.

The present invention is in no way limited to the embodiment that has been described and shown, but a person skilled in the art will know how to add any variant thereto according to the invention.

The protection system could thus be used on devices other than electrochemical cells of storage batteries.

The invention claimed is:

1. A protection system for an electrochemical cell of a storage battery having variable internal resistance, the electrochemical cell including a casing, a positive terminal connected to a positive electrode, and a negative terminal connected to a negative electrode, the protection system comprising:

a switch connected between the positive terminal and the negative terminal, the switch being configured to close in response to an overpressure in the casing, a fuse positioned between the positive terminal and the positive electrode, the fuse being configured to melt when a current of a strength greater than a strength threshold flows through the fuse, circuitry configured to:

estimate the internal resistance of said electrochemical cell, compare the internal resistance with a first resistance threshold, a second resistance threshold, and a third resistance threshold, prevent a recharging of said electrochemical cell as soon as said internal resistance is greater than the first resistance threshold chosen such that the electrochemical cell does not have a capacity to melt the fuse above the first resistance threshold, and limit the recharging of said electrochemical cell to a predetermined number of additional charging cycles as soon as said internal resistance is greater than the third resistance threshold chosen such that the electrochemical cell still has the capacity to melt the fuse above the third resistance threshold, the third resistance threshold being less than the first resistance threshold.

2. The protection system as claimed in claim 1, wherein the circuitry is configured to estimate said internal resistance only when one or more of the following conditions are met:

the electrochemical cell is in a discharging phase, the strength of the current delivered by the electrochemical cell is within a range of predefined values, a variation over time of the strength of the current delivered by the electrochemical cell is greater than a predefined variation threshold, and an internal temperature of said electrochemical cell is within a range of predefined temperatures.

3. The protection system as claimed in claim 1, wherein the circuitry is configured to attempt to estimate said internal resistance periodically.

4. The protection system as claimed in claim 1, wherein the circuitry is configured to warn a user of an upcoming limitation and/or an upcoming prevention of the use of the electrochemical cell by the circuitry when the internal resistance is greater than the second resistance threshold.

5. The protection system as claimed in claim 4, wherein the circuitry is configured to warn the user without limiting the charging of the electrochemical cell when the internal resistance is greater than the second resistance threshold but less than the third resistance threshold.

6. The protection system as claimed in claim 1, wherein the circuitry includes a display screen and, when the internal resistance is below the first resistance threshold and above the second resistance threshold, the circuitry is programmed to output a signal to the display screen to display a message that the electrochemical cell will be unusable after the one or two additional recharging cycles.

7. A storage battery comprising:

at least one electrochemical cell equipped with the protection system as claimed in claim 1.

8. A method for protecting an electrochemical cell of a storage battery having variable internal resistance, the electrochemical cell including a casing, a positive terminal connected to a positive electrode, and a negative terminal connected to a negative electrode, the electrochemical cell being equipped with a fuse positioned between the positive terminal and the positive electrode and a switch connected between the positive terminal and the negative terminal, the switch being configured to close in response to an overpressure in the casing, the method comprising:

estimating the internal resistance of said electrochemical cell, comparing the internal resistance with a first resistance threshold, a second resistance threshold, and a third resistance threshold, preventing recharging of the electrochemical cell as soon as said internal resistance is greater than the first resistance threshold chosen such that the electrochemical cell does not have a capacity to melt the fuse above the first resistance threshold, and limit the recharging of said electrochemical cell to a predetermined number of additional charging cycles as soon as said internal resistance is greater than the third resistance threshold chosen such that the electrochemical cell still has the capacity to melt the fuse above the third resistance threshold, the third resistance threshold being less than the first resistance threshold.

\* \* \* \* \*